(No Model.)
A. WESSON.
STOCK MUZZLE.
No. 348,438. Patented Aug. 31, 1886.
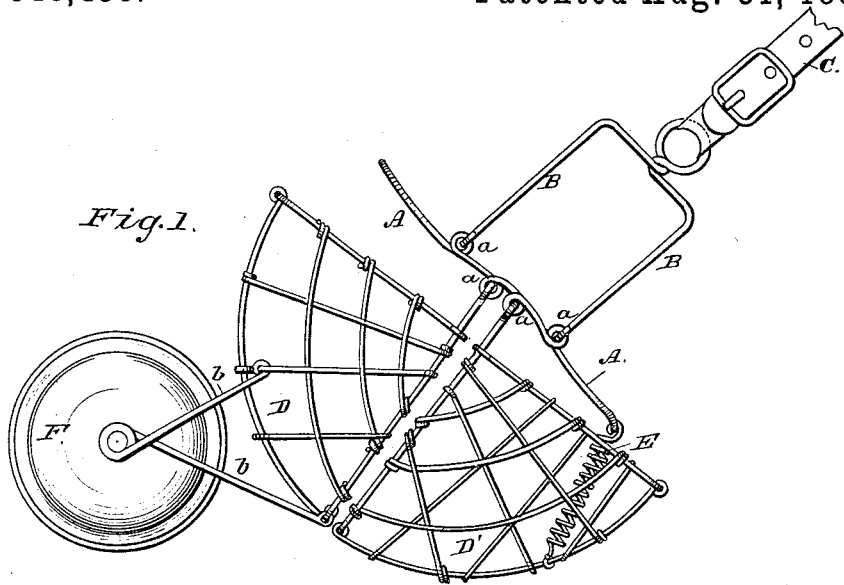
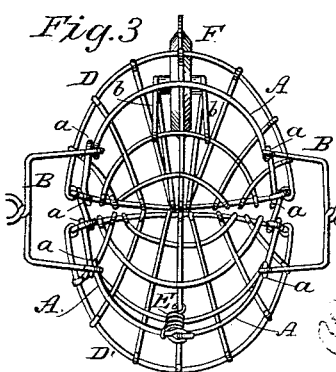
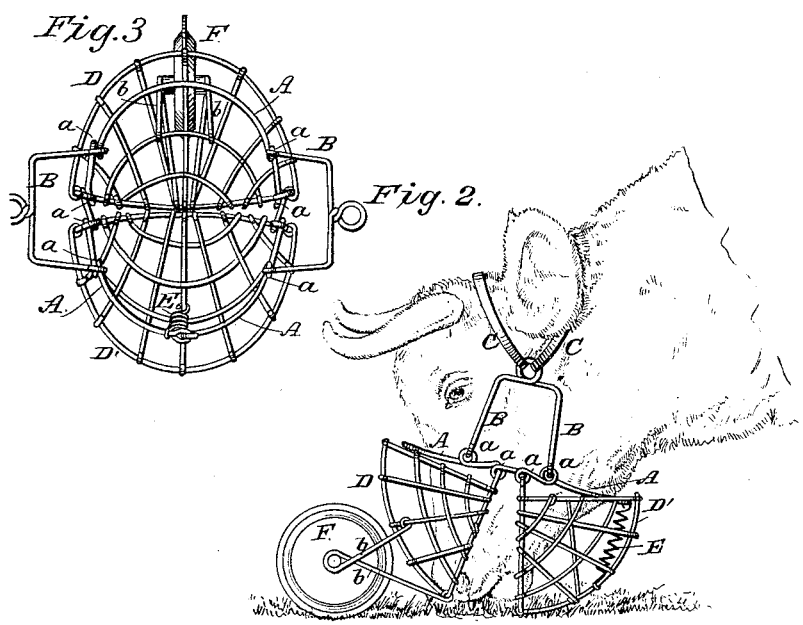
WITNESSES:
Fred G. Dieterich
Amos W. Hart
INVENTOR:
Abner Wesson
BY Munn & Co
ATTORNEYS.

UNITED STATES PATENT OFFICE.

ABNER WESSON, OF MEMPHIS, TENNESSEE.

STOCK-MUZZLE.

SPECIFICATION forming part of Letters Patent No. 348,438, dated August 31, 1886.

Application filed June 14, 1886. Serial No. 205,138. (No model.)

*To all whom it may concern:*

Be it known that I, ABNER WESSON, of Memphis, in the county of Shelby and State of Tennessee, have invented a new and useful Improvement in Stock-Muzzles, of which the following is a specification.

The object of my invention is to provide an improved muzzle for stock which will allow an animal to which it is applied to feed on grass or shrubs growing close to the ground, but prevent it from biting trees or plants of high growth. In other words, my improved muzzle is constructed with hinged jaws which open automatically when a portion of it is pressed on the ground, and close automatically when the animal raises its head so as to remove such portion from contact with the ground.

The features of construction and combination of parts are as hereinafter described and claimed.

In accompanying drawings, Figure 1 is a side view. Fig. 2 is a side view illustrating the device in practical operation. Fig. 3 is a plan view.

The muzzle is composed of the following parts: a ring or band, A, for encircling an animal's nose; two cheek-pieces, B B, hinged thereto, and serving, in connection with straps C, to secure the muzzle to the animal's head; two wire-work jaws, D D', which are hinged to the nose-ring A; a spiral spring, E, that connects the rear jaw, D', with said nose-ring, and a wheel, F, constituting a fixed attachment of the front jaw, D. All the parts of the muzzle are constructed of wire, save the wheel F, which may be also formed of that material; but I deem tinned iron or wood preferable. The nose-ring A is formed with eyes or loops $a$, to which the cheek-pieces B and jaws D D' are jointed by corresponding eyes, as shown. The points of attachment of the jaws D D' to the nose-ring A are near the middle of the latter, on each side, so that when the animal's head is raised they will hang suspended and remain closed by the effect of gravity, as shown in Fig. 1. To cause them to open when the animal puts his nose to the ground is the function of the wheel F, which is journaled in a bracket consisting of rigid arms $b$, extending forward from the lower portion of the front jaw, D. The wheel projects below the jaws, and necessarily strikes the ground first and rolls along, thus serving as a movable point of leverage by which, as the animal continues to press its nose downward, (see Fig. 2,) the front jaw, D, is caused to turn on its joints or hinges $a$ and separate from the other, D'. The latter is also drawn simultaneously backward by the action of spring E—that is to say, the said jaw D' being connected with the rear portion of the nose-ring by the spring, the latter slightly retracts the former, or, rather, prevents it from hanging vertical, so that it does not remain interposed between the animal's mouth and the grass or other food it desires to reach. Another advantage of the spring is that it relieves the strain or pressure that would otherwise be applied to the animal's nose and jaw.

In further definition of the scope of my invention, I will state that the wheel F possesses great advantage over fixed rods, (which I am informed have been used to aid in opening the jaws of a stock-muzzle,) since it will readily roll over small obstacles or obstructions, so that the jaw A may be opened without difficulty.

What I claim is—

1. In combination with the hinged front jaw of a stock-muzzle, a wheel journaled in arms attached to the same, substantially as shown and described.

2. The combination, with the nose-ring and jaws hinged thereto, of the rolling wheel attached to the front jaw and the spring connecting the rear jaw with said nose-ring, as shown and described.

ABNER WESSON.

Witnesses:
THOS. T. TAYLOR,
J. M. COLEMAN, Jr.